July 7, 1959
H. B. BARRETT
2,893,180
METHODS AND MEANS FOR GRINDING AUTOMOTIVE BRAKE SHOES
Original Filed Dec. 12, 1956
3 Sheets-Sheet 2
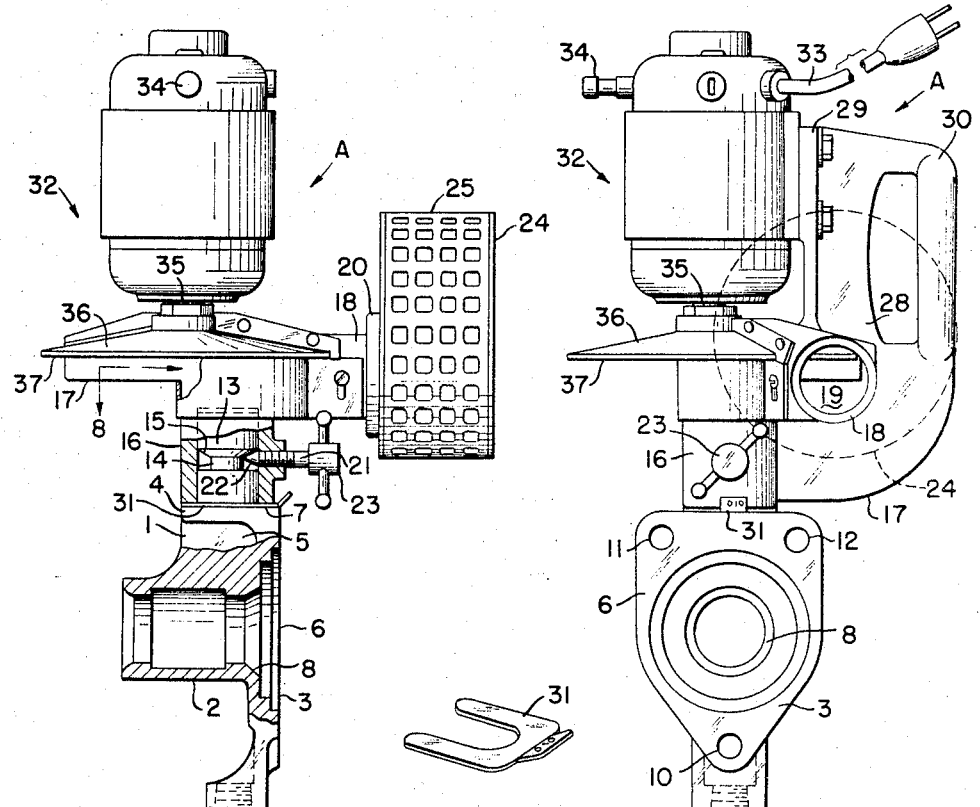
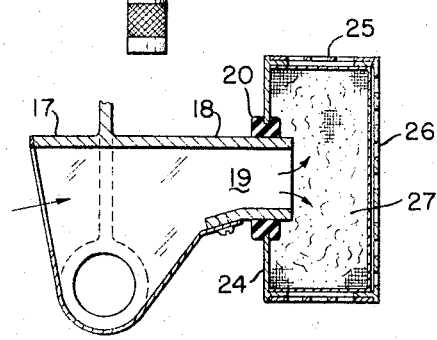
FIG-6  FIG-9  FIG-7
FIG-8
INVENTOR.
HARRY B. BARRETT
BY
ATTORNEY July 7, 1959 H. B. BARRETT 2,893,180
METHODS AND MEANS FOR GRINDING AUTOMOTIVE BRAKE SHOES
Original Filed Dec. 12, 1956 3 Sheets-Sheet 3

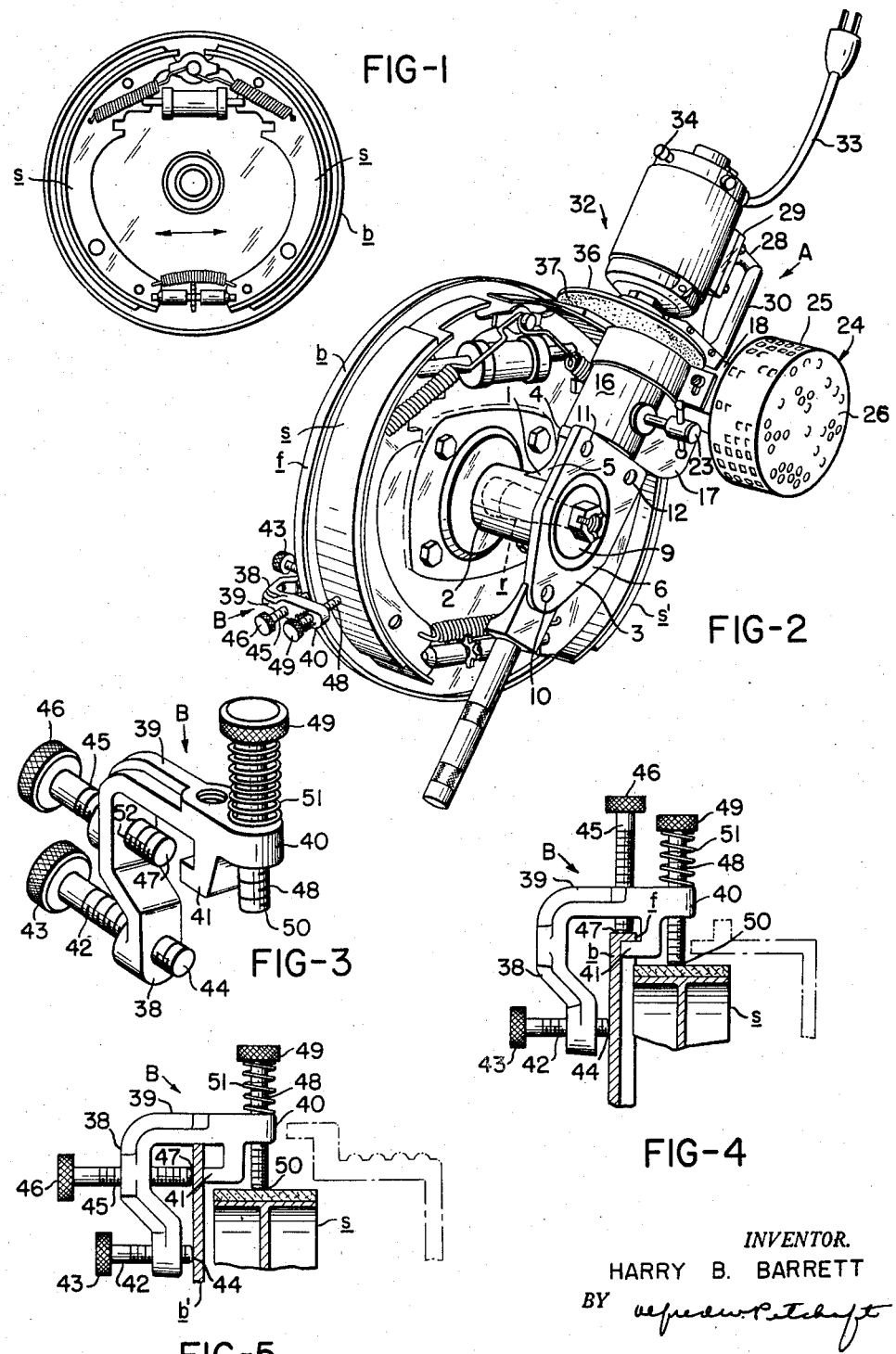

INVENTOR.
HARRY B. BARRETT
BY
ATTORNEY

United States Patent Office 2,893,180
Patented July 7, 1959

2,893,180

METHODS AND MEANS FOR GRINDING AUTOMOTIVE BRAKE SHOES

Harry B. Barrett, Clayton, Mo.

Original application December 12, 1956, Serial No. 627,895. Divided and this application December 16, 1957, Serial No. 702,850

4 Claims. (Cl. 51—281)

This invention relates to certain new and useful improvements in methods and means for grinding automotive brake shoes and is a continuation-in-part of my copending application Serial No. 551,840, filed December 8, 1955, now Patent No. 2,822,650, dated February 11, 1958, and is a division of my copending application Serial No. 627,895, filed December 12, 1956.

Automotive brakes have created a serious brake servicing problem. As is well known, automatic automotive transmissions impose severe wear and tear on automotive brake systems and such transmissions are now very generally used even in the so-called "low-priced car" field. Consequently, more frequent servicing and repair of automotive brakes becomes necessary. Furthermore, present day types of brake systems require concentric grinding while the shoes are mounted in operating position on the backing plate, inasmuch as such procedure becomes the only practical method of shoe centralization. However, the current widespread adoption and use of full floating shoes makes such brake shoe grinding very difficult for the reason that both brake shoes are aligned on a common pivot point called the shoe anchor and are attached at the opposite ends with an expanding adjuster for wear. The shoes tend to shift diametrally as a unit when grinding or adjusting pressure is applied to either single shoe.

It is, therefore, the primary object of the present invention to provide a method and means for concentrically grinding automotive brake shoes of the full floating type while the latter are mounted in operative position upon the backing plate of the brake.

It is a further object of the present invention to provide means for stabilizing or holding the brake shoe assembly of full floating shoes, while one shoe is being ground so that the shoe being ground will be properly positioned and will thereby be ground to a proper concentric arc.

It is another object of the present invention to provide a method and means for grinding automotive brake shoes of the full floating type so that the braking surfaces of such shoes are precisely concentric quickly, simply, and conveniently, and in a manner which can be employed by the average automotive mechanic with very simple training or instruction.

With the above and other objects in view, my invention resides in the novel features of form, construction, arrangement, and combination of parts presently described and pointed out in the claims.

In the accompanying drawings (three sheets)—

Fig. 1 is a diagrammatic view of an automotive brake having so-called "full floating" shoes;

Fig. 2 is a perspective view of an automobile brake assembly showing the installation thereon of a brake shoe grinder, said grinder being shown on the front spindle of an automobile, constructed in accordance with and embodying the present invention;

Fig. 3 is a perspective view of the brake shoe positioner forming a part of the present invention;

Figs. 4 and 5 are side elevational views of the brake shoe positioner as respectively applied to two different types of backing plates currently in use;

Fig. 6 is a side elevational view, partly broken away and in section, of a brake shoe grinder constructed in accordance with and embodying the present invention;

Fig. 7 is a front elevational view of the brake shoe grinder;

Fig. 8 is a fragmentary sectional view taken along line 8—8 of Fig. 6;

Fig. 9 is a perspective view of a shim forming a part of the present invention;

Figure 10:
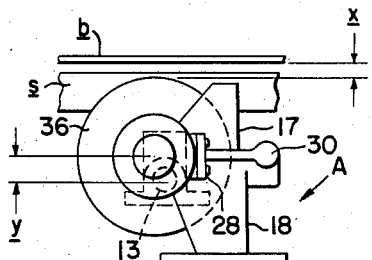
Figs. 10 and 11 are comparative diagrammatic views of the brake shoe grinder, illustrating the manner of adjustment thereof in relation to various brakes having different dimensional relationships.

In order to understand the present invention, it perhaps should be pointed out that an automotive brake having so-called "full floating" brake shoes is a brake which comprises a backing plate $b$, as shown in Fig. 1, and two arcuate brake shoes $s$ mounted thereon in such a manner that the shoes $s$ will shift as a unit in a diametral or crosswise direction as indicated by the arrow depending upon the direction in which external force is applied. The specific construction of such automotive brakes, however, is conventional and, therefore, need not be described in particular detail herein. The present invention, broadly speaking, resides in providing a simple and effective method for servicing such brakes by holding one shoe stationary and thereby locating the other shoe in proper position so that its braking surface can be concentrically ground. Such other shoe is then concentrically ground by a grinding tool operatively mounted on the axle spindle or axle. Thereupon, the ground shoe is held stationary so as to position the first shoe and the braking surface of that shoe similarly ground in turn. The present invention also includes the provision of novel shoe positioning and shoe grinding means for carrying out such method.

Referring now in more detail and by reference characters to the drawings, which illustrate practical embodiments of the present invention, A designates a brake shoe grinder somewhat similar to that brake shoe grinder described in the above-mentioned copending application, and comprising a spindle-mounted bracket 1 integrally including a sleeve 2, an abutment plate 3, and a shoulder plate 4 connected by a reinforcing web 5. The abutment plate 3 and shoulder plate 4 are respectively provided with precisely machined outwardly presented contact faces 6, 7, which are relatively perpendicular. Furthermore, the contact face 7 is parallel to the longitudinal axis of the sleeve 2, the latter being provided at one end with a tapered counterbore 8, which is adapted to receiver either a conventional wheel bearing or a conical adapter 9, by which the sleeve 2 can be fitted upon a conventional tapered front axle spindle $r$.

The abutment plate 3 is preferably somewhat triangular in peripheral contour and is provided with three apertures 10, 11, 12, all of which are located at equal radial distances outwardly from the longitudinal center line of the sleeve 2 and are sized for snug-fitting, but slidable, disposition over the axle mounting studs of an automobile rear wheel, the latter being conventional and, hence, not being shown.

Mounted rigidly in, and extending outwardly from, the shoulder plate 4 is a grinder-frame supporting post 13 having its longitudinal axis perpendicular to the contact face 7 of the shoulder plate 4 and being provided intermediate its ends with a peripheral groove 14 having a tapered face 15.

Rotatably mounted on the post 13 by means of an integrally formed collar 16 is a radially outwardly projecting frame 17 integrally including an offset arm 18 having an internal passage or air duct 19 terminating in a collar-fitting 20. The collar 16 is drilled and tapped to receive a retainer screw 21 having a tapered end 22 for engagement in the groove 14 and being provided on its outer end with a diametral handle 23. Removably mounted upon the collar-fitting 20 is a filter-cannister 24 having a perforated side wall 25 and perforated end wall 26. The cannister 24 is filled with a suitable filter medium 27. Formed integrally with and extending upwardly from the frame 17 is a motor-supporting bracket 28 including a mounting pad 29 and handle-grip 30. Also provided for optional use upon the post 13 between the collar 16 and the contact face 7 are U-shaped shims 31. These shims 31 can be provided in varying thickness and afford a means of varying the radial distance between the frame 17 and the longitudinal axis of the sleeve 2, the matching tapers of the groove 14 and retainer screw 21 being such as to permit the collar 16 to be locked to the post 13 in various positions of axial adjustment within adequate limits to accommodate various shims 31 of different thicknesses.

Bolted or otherwise rigidly secured upon the mounting pad 29 is an electric grinder 32 having a conventional electrical connector cord 33, switch 34, and grinder shaft 35, the latter being removably provided with a disk-shaped grinder plate 36 having an abrasive disk 37 adhesively or otherwise suitably secured to its exposed face.

Figure 11:
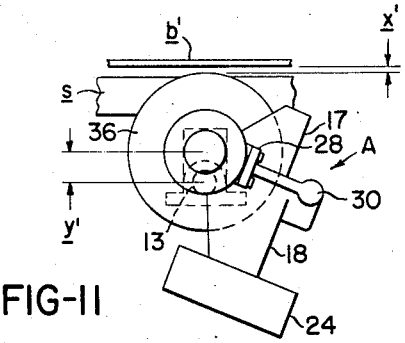

As will be noted from Fig. 6, the axis of the shaft 35 is parallel, but laterally offset from, the axis of the post 13. Furthermore, the collar 16 is rotatable upon the post 13 when the retainer screw 21 is disengaged from the groove 14. Thus, the frame 17, together with the grinder 32 and related structure can be swung around to various positions of adjustment as diagrammatically shown in Figs. 10 and 11. By this means the inner edge of the grinder plate 36 can be located, for instance, at the distance $x$ from the backing plate $b$ with an axial post-to-shaft displacement $y$ as shown in Fig. 10. Similarly, for a brake of somewhat different dimension or design, the grinder plate 36 can be located at a distance $x'$ from the backing plate $b'$ with an axial post-to-shaft displacement of $y'$ as shown in Fig. 11.

Provided for use in practicing the method of the present invention is a somewhat L-shaped shoe positioning clamp B comprising a side leg 38 and a top leg 39, the latter being integrally provided at its outer end with an extension 40 and an inwardly turned hook-flange 41. Threadedly mounted in, and extending through, the lower end of the side leg 38 is an adjustment screw 42 having a knurled knob 43 at its outer end and a round-off contact face 44 on its inner end. Similarly mounted in the side leg 38 is an adjustment screw 45 having a knurled knob 46 at its outer end and a blunt contact face 47 at its inner end. Also threadedly mounted in, and extending through, the extension 40 is an adjustment screw 48 having a knurled knob 49 at its outer end and a blunt contact face 50 at its inner end. Mounted encirclingly around the adjustment screw 48 between the knob 49 and the extension 40 is a spring 51. The side leg 38 is also provided with an internally threaded alternate aperture 52 into which the adjustment screw 45 can also be optionally inserted.

The shoe positioning clamp B is fastened upon the backing plate $b$ and clamped upon the peripheral flange $f$ thereof, substantially as shown in Fig. 4, and the screw 48 adjusted to bear against the brake shoe $s$ and hold it stationary in a selected position so that the opposite shoe $s'$ is also positioned in precise relation to the center line of the brake assembly and can be accurately ground. In the case of a brake of somewhat different design wherein the backing plate $b'$ does not have a peripheral flange $f$, the adjustment screw 45 can be inserted in the alternate aperture 52 and the clamp B thereby firmly attached as shown in Fig. 5.

In use, the brake shoe grinder A may be mounted upon the axle spindles of a front wheel assembly, substantially in the manner shown in Fig. 2, in which case the frame 17 will be positioned on the post 13 in relation to the mounting bracket 1, so that the abutment plate 3 will be faced outwardly, as shown. If the brake lining is to be ground to the so-called "normal" size, none of the shims 31 need be used and the set screw or retainer screw 21 may then be tightened down so that the frame 17 will be locked securely in such position. If, however, the brake shoe is to be ground several thousandths oversize, one or more shims 31 may be slipped over the post 13 between the contact face 7 and the collar 16 so as to shift the frame 17 toward or away from the contact face 7 by the required amount. When the desired adjustment has been thus effected, the retainer screw 21 is tightened down to hold the frame 17 rigidly in such adjusted position.

Similarly, the grinder A may be mounted on a rear axle assembly substantially in the manner shown and described in detail in connection with the somewhat similar brake shoe grinder forming the subject-matter of my copending application, Serial No. 551,840, above-mentioned.

Thereupon, the electrical connector cord 33 can be plugged into any conventional source of electrical current and the switch 34 closed to energize the grinder and rotate the grinder plate 36. With the grinder plate 36 rotating, the frame 17 is swung to-and-fro in a circumferential arc to grind a truly concentric surface upon the braking surfaces of the brake shoes.

After the shoe $s'$ has been properly ground, the shoe positioning clamp B is removed and remounted to hold the shoe $s'$ and leave the shoe $s$ in position to be ground. When this adjustment has been made, the shoe $s$ may be ground in the same manner and precisely to the same concentric arc. Finally, the positioning clamp B is removed and the brake reassembled for use. In this connection, it should be noted that the positioning clamp B is of such size and shape that the drum cannot be reinstalled until the clamp is removed, thereby making it impossible for the mechanic to inadvertently leave the clamp in the brake assembly.

Figure 12:
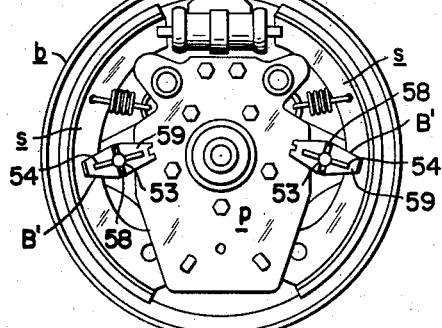
Fig. 12 is a front elevational view of a brake assembly illustrating the use of a modified form of brake shoe positioner.
Figure 13:
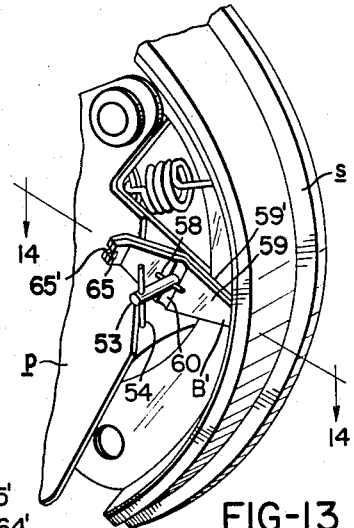
Fig. 13 is a fragmentary perspective view of the brake assembly and modified form brake shoe positioner shown in Fig. 12.
Figure 14:
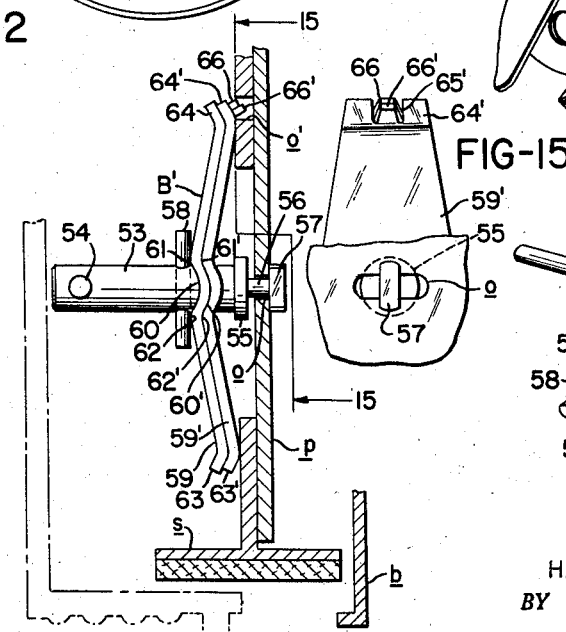
Fig. 14 is a fragmentary sectional view taken along line 14—14 of Fig. 13.
Figure 15:
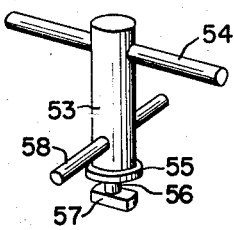
Fig. 15 is a fragmentary sectional view taken along line 15—15 of Fig. 14.
Figure 16:
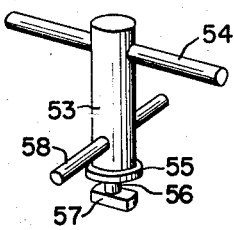
Fig. 16 is a perspective view of the locking post forming a part of the brake shoe positioner shown in Figs. 12 to 15, inclusive.

There is another type of automotive brake assembly of the type shown in Figs. 12 and 13 which is widely in use on automobiles manufactured by Chrysler Corporation and its affiliates, and such brake assemblies employ an intermediate plate $p$ which is provided with elongated or oval-shaped apertures $o$. For use with such brake assemblies, a modified form of clamp B' is provided, comprising a short rod 53 having a handle member 54 extending diametrally through its outer end. At its other end, the rod 53 is integrally provided with a diametrally enlarged annular flange 55 and a diametrally reduced neck 56 sized to fit loosely within the aperture $o$. At its outer end, the neck 56 is provided with a diametrally disposed cross-bar 57 also sized to pass through the aperture $o$ when properly aligned therewith. Extending diametrally through the rod 53 a short distance outwardly with respect to the flange 55 is a pin 58 which may be soldered, shrunk, or otherwise tightly fitted in place and loosely disposed on the rod 53 between the pin 58 and the flange 55 are two matching inter-nested spring-leaves 59, 59', comprising diametrally extending central grooves 60, 60', bordered by parallel ridges 61, 61', and 62, 62', respectively. At their outer ends, the spring-leaves 59, 59', are curled up in the provision of end-flanges 63, 63', and 64, 64', respectively, the latter being centrally bifurcated as at 65, 65', and struck down in the provision of positioning ears 66, 66'. Normally, the rod 53 is turned so that the pin 58 lies in the groove 60 and the spring-leaves 59, 59', are loose. In this position, also, the cross-bar 57 can be readily inserted through the aperture o. Thereupon, the spring-leaves 59, 59', can be positioned in the shoe-straddling position shown in Figs. 12 and 13, with the ears 66, 66', located in an available auxiliary aperture o'. Then the rod 53 is pressed inwardly flexing the spring-leaves 59, 59', until the neck 56 extends through the aperture o, whereupon the rod 53 is turned 90° to rotate the cross-bar 57 into the position shown in Fig. 15, thereby locking the clamp B' securely in place and clamping the brake shoe nonshiftably in place for grinding in the manner heretofore described. The clamp B' also is of such size and shape that it must be removed before the brake can be reassembled and, therefore, cannot be accidentally left in the brake assembly.

It should be understood that changes and modifications in the methods and means hereinabove set forth may be made and substituted for those herein specifically shown and described without departing from the nature and principle of my invention.

Having thus described my invention, what I claim and desire to secure by Letters Patent is:

1. The method of surfacing the braking faces of brake shoes in automotive brakes of the full floating shoe type, which method comprises removing the wheel and brake drum to expose the backing plate and brake shoes operatively mounted thereon, holding only one shoe rigidly in properly aligned position with respect to the backing plate and thereby causing the other shoe to assume a properly aligned position with reference to the backing plate, and grinding the braking surface of said other shoe to form thereon a cylindrical surface which conforms to an arc that is concentric in relation to the axis around which the wheel and drum turn when the latter are in operative position.

2. The method of surfacing the braking faces of brake shoes in automotive brakes of the full floating shoe type, which method comprises removing the wheel and brake drum to expose the backing plate and brake shoes operatively mounted thereon, releasably clamping only one shoe to the backing plate in properly aligned position and thereby causing the other shoe to assume a properly aligned position with reference to the backing plate, and grinding the braking surface of said other shoe to form thereon a cylindrical surface which conforms to an arc that is concentric in relation to the axis around which the wheel and drum turn when the latter are in operative position.

3. The method of surfacing the braking faces of brake shoes in automotive brakes of the full floating shoe type, which method comprises removing the wheel and brake drum to expose the backing plate and brake shoes operatively mounted thereon, holding only one shoe rigidly in properly aligned position with respect to the backing plate and thereby causing the other shoe to assume a properly aligned position with reference to the backing plate, grinding the braking surface of said other shoe to form thereon a cylindrical surface which conforms to an arc that is concentric in relation to the axis around which the wheel and drum turn when the latter are in operative position, thereupon releasing the first-named shoe, rigidly securing only the second-named shoe in properly aligned relation to the backing plate whereby to cause the first-named shoe to assume a properly aligned position in relation to the backing plate, and grinding the braking surface of the first-named shoe to form thereon a cylindrical surface which is precisely concentric with the cylindrical surface formed on the second-named shoe.

4. The method of surfacing braking faces of brake shoes in automotive brakes of the full floating shoe type in which said brakes include an intermediate plate, which method comprises removing the wheel and brake drum to expose the backing plate and intermediate brake and brake shoes operatively mounted thereon, holding only one shoe rigidly in properly aligned position with respect to the backing plate by clamping said one shoe to the intermediate plate and thereby causing the other shoe to assume a properly aligned position with reference to the backing plate, and grinding the braking surface of said other shoe to form thereon a cylindrical surface which conforms to an arc that is concentric in relation to the axis around which the wheel and drum turn when the latter are in operative position.

References Cited in the file of this patent

UNITED STATES PATENTS 2,031,357  Barrett  Feb. 18, 1936